Patented Jan. 1, 1924.

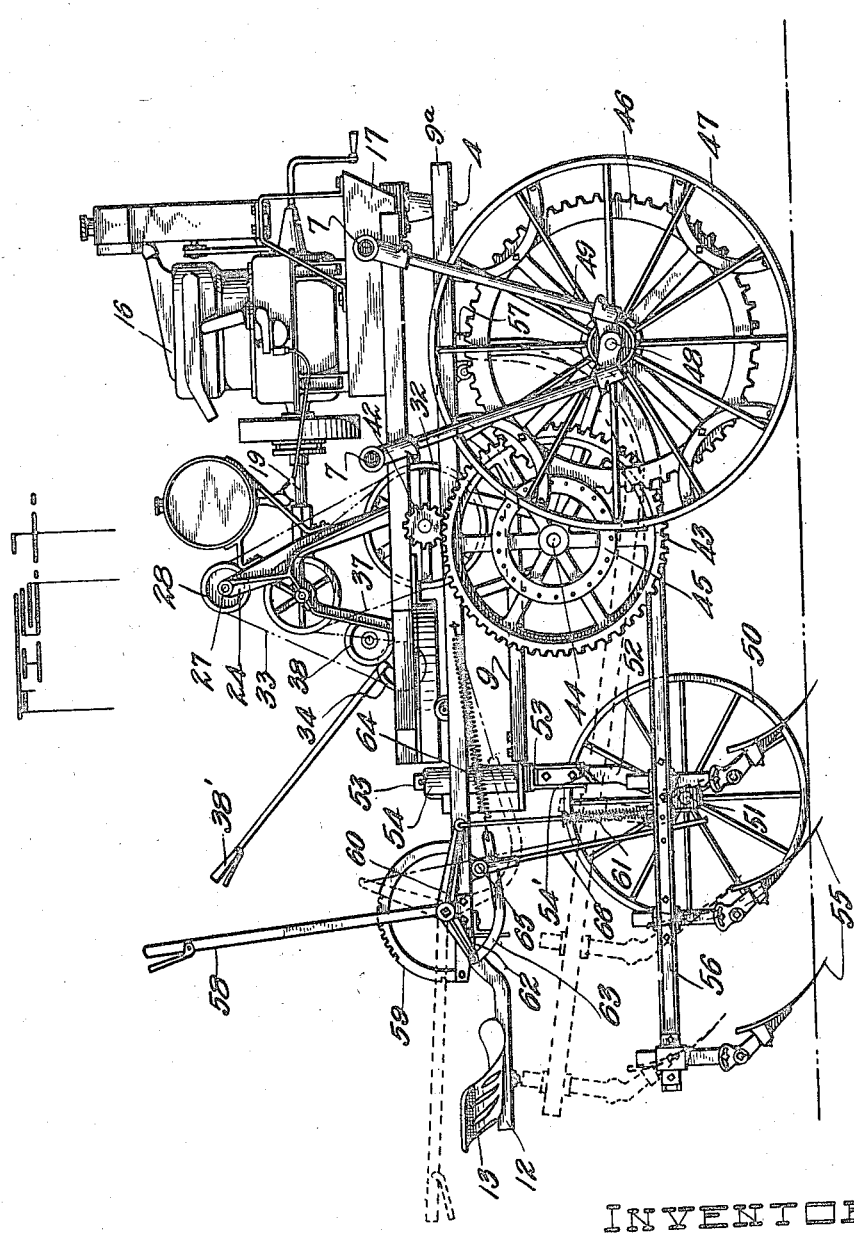

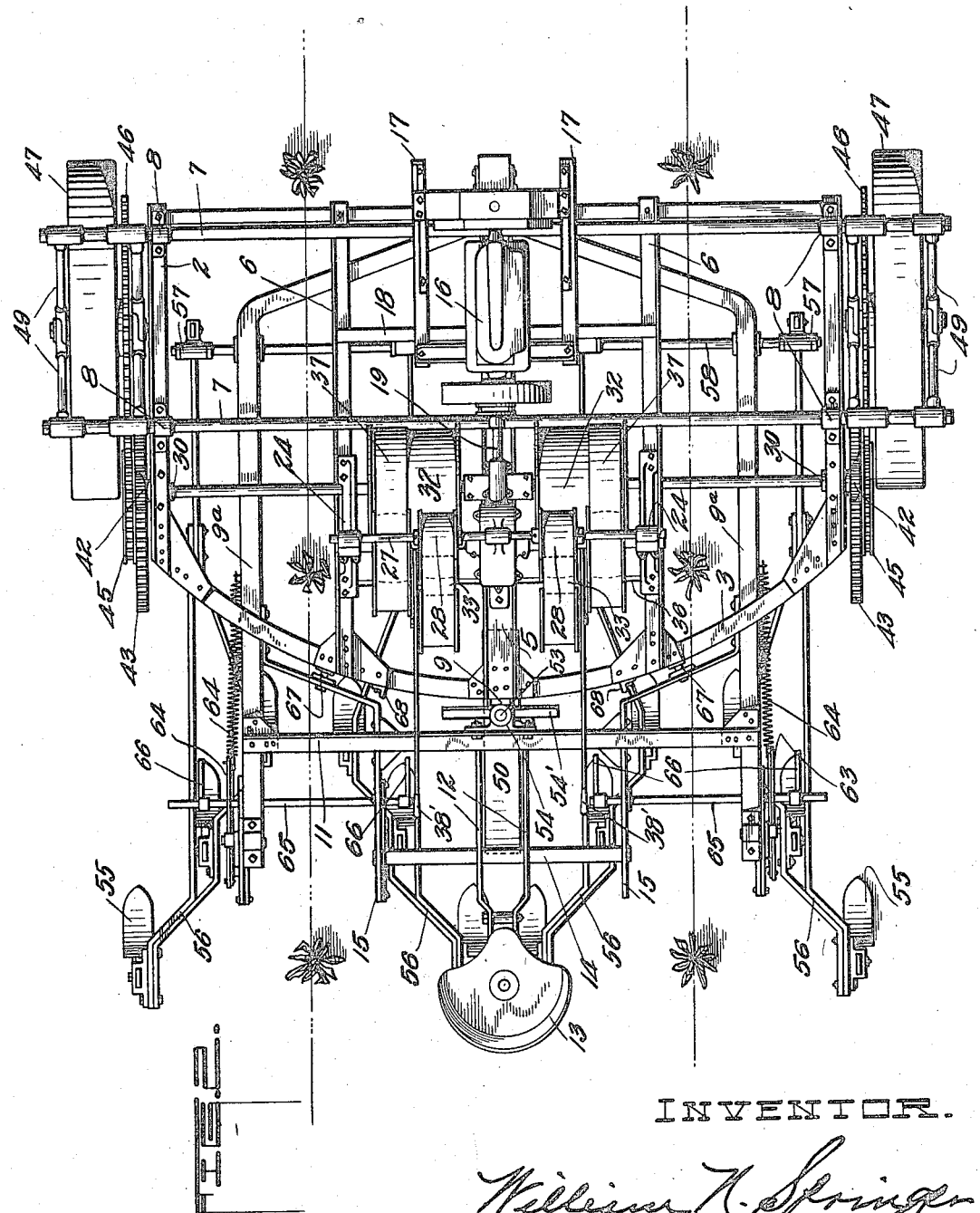

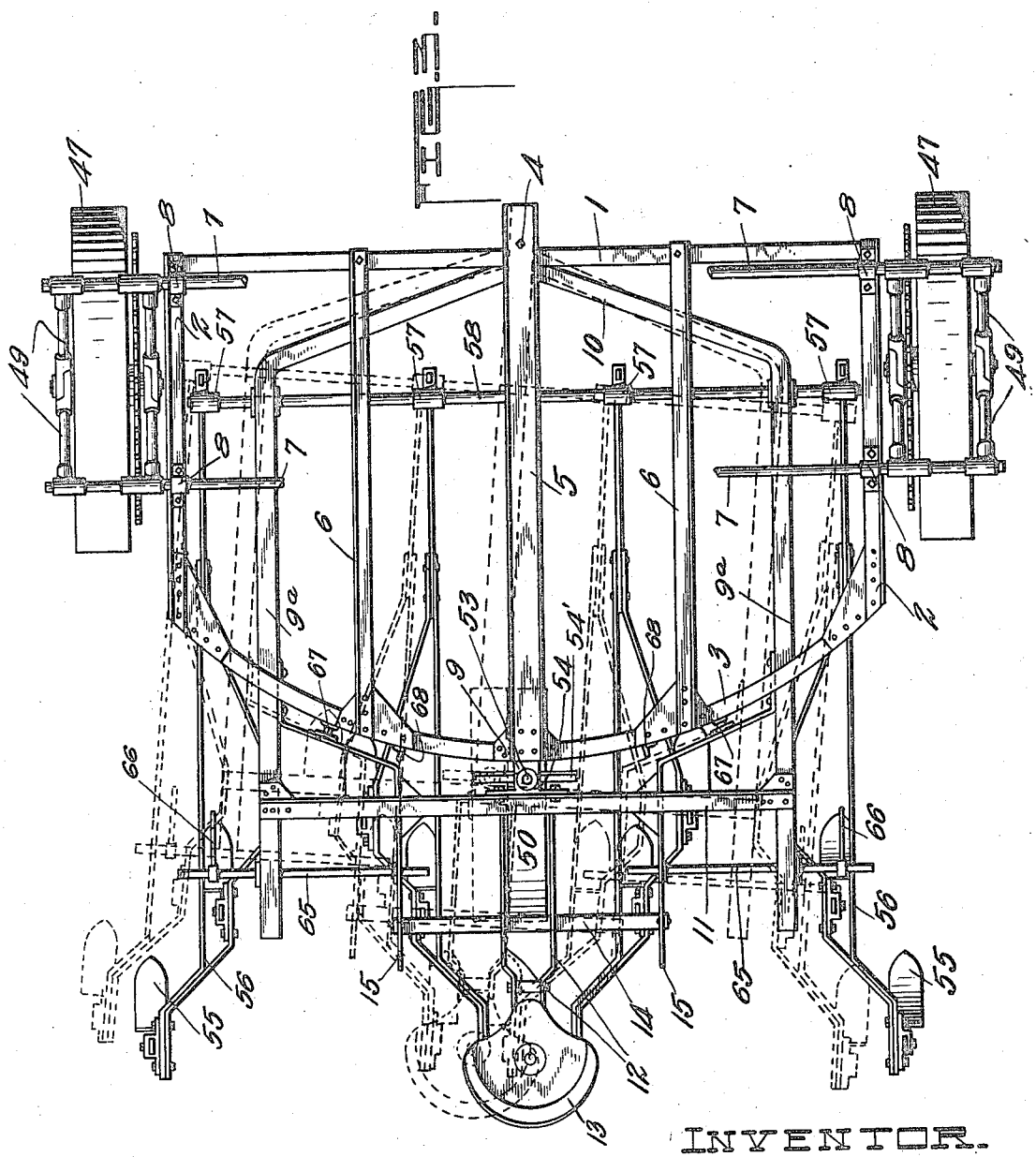

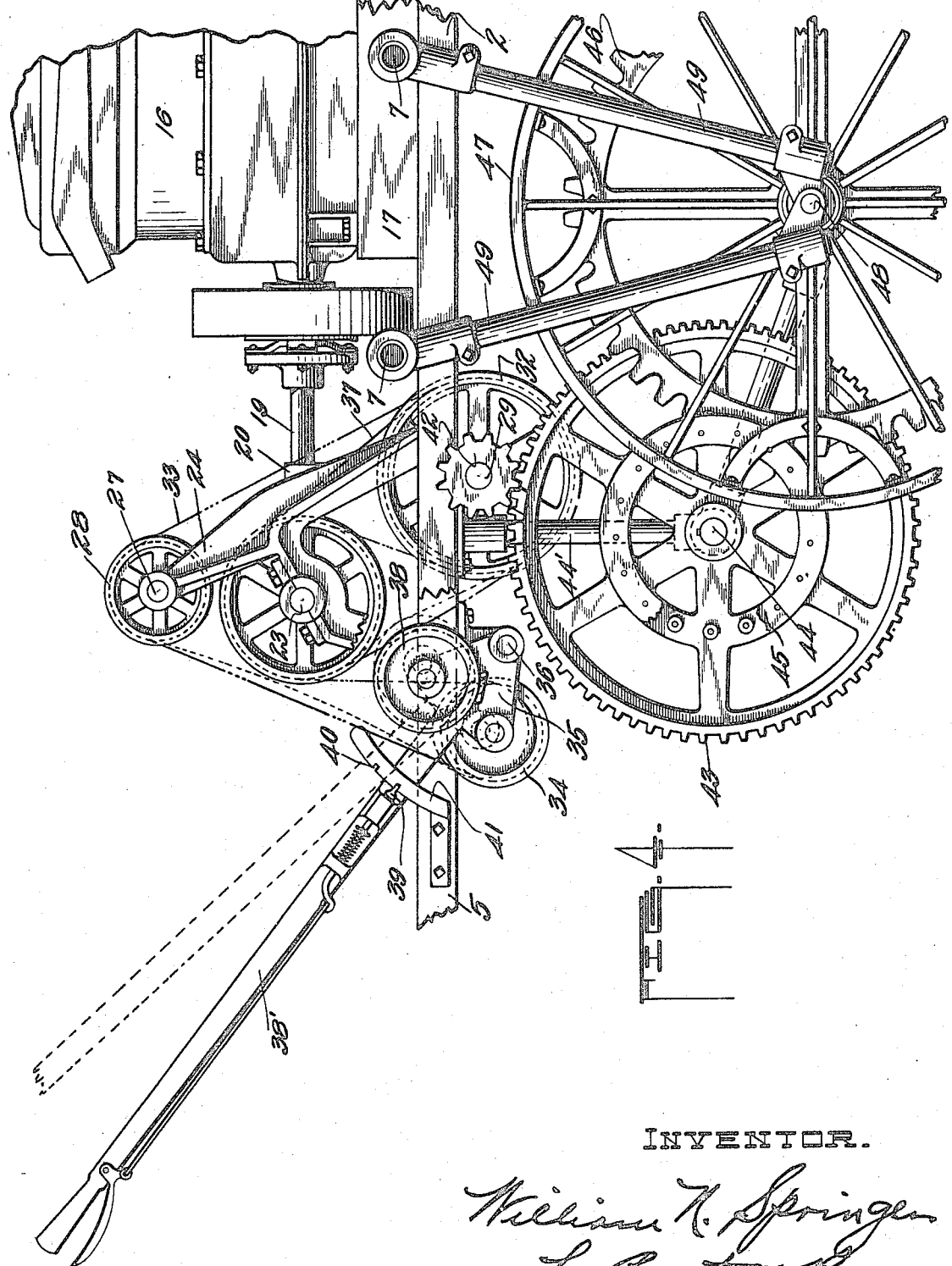

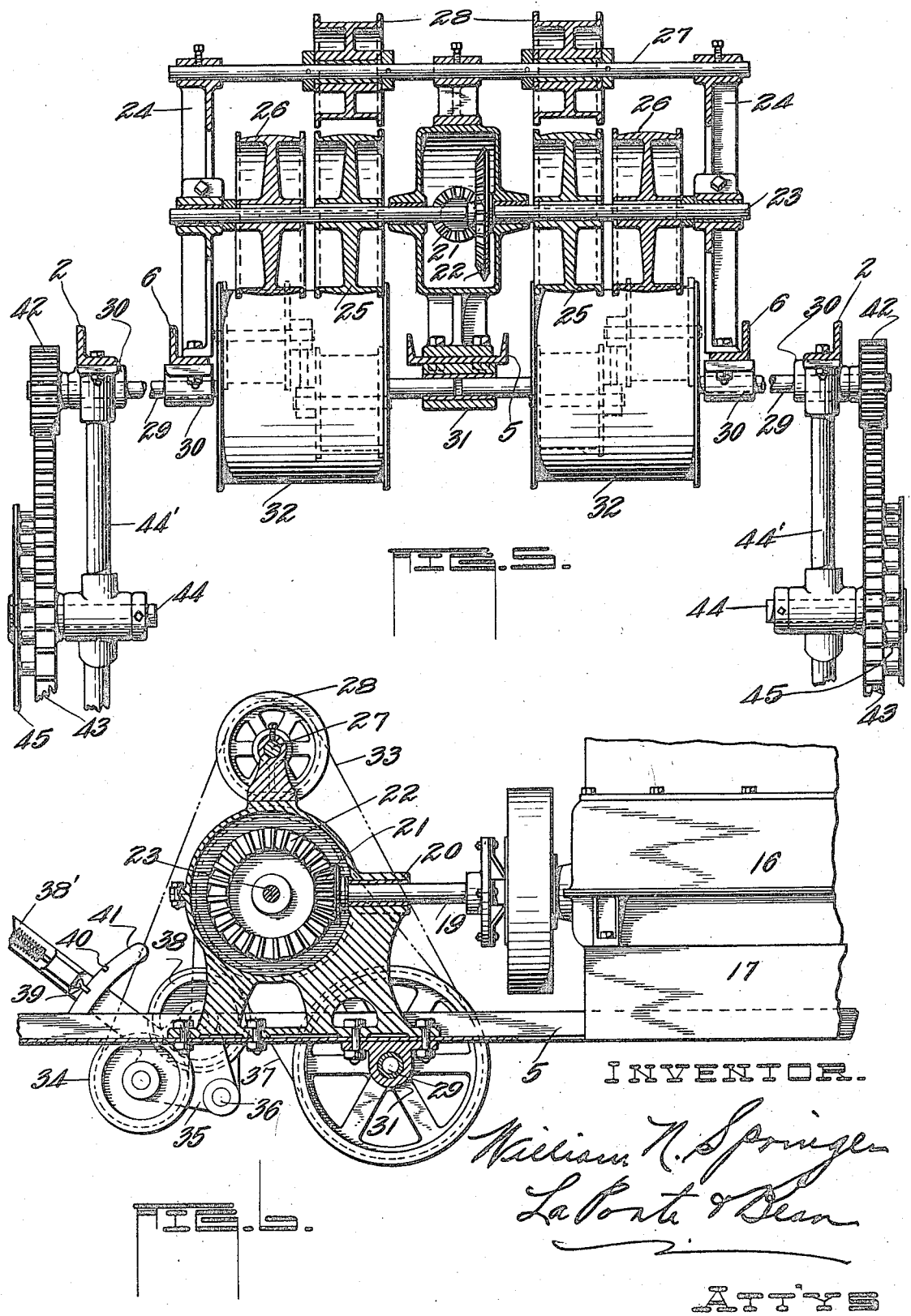

1,479,092

UNITED STATES PATENT OFFICE.

WILLIAM N. SPRINGER, OF PEORIA, ILLINOIS, ASSIGNOR, BY MESNE ASSIGNMENTS, TO GENERAL MOTORS CORPORATION, OF DETROIT, MICHIGAN, A CORPORATION OF DELAWARE.

MOTOR-PROPELLED AGRICULTURAL MACHINE.

Application filed August 30, 1917. Serial No. 189,017.

*To all whom it may concern:*

Be it known that I, WILLIAM N. SPRINGER, a citizen of the United States, a resident of Peoria, in the county of Peoria and State of Illinois, have invented new and useful Improvements in Motor-Propelled Agricultural Machines, of which the following is a specification.

This invention has reference to motor propelled agricultural machines and relates particularly to a two-row cultivator, the source of power being mounted on a frame supported at its front on a pair of traction driving wheels, and at its rear on a single centrally disposed caster wheel, having a swiveled connection with an under-frame pivotally connected with said motor supporting frame; the cultivating instrumentalities being connected with said under-frame.

The invention has reference further, to a motor propelled cultivator, comprising a main frame mounted upon a pair of forward traction driving wheels; an under-frame having a pivotal connection with the main frame at the front thereof and mediate said traction wheels, the rear of said under-frame mounted on a swiveled caster wheel, having foot rests for the operator by means of which the cultivator may be guided, the beams for the cultivating shovels having a pivotal connection with said pivoted under-frame, and means for raising and lowering said beams.

The invention further embodies a power transmitting mechanism between the motor and traction driving wheels, so constructed and arranged that the operator may control the operation of said transmission and direct the movement of the machine in a forward or backward direction, and for the purpose of turning the machine in its own tracks, or upon the traction wheels at either side of the machine.

Other objects and aims of the invention will be more fully understood from the following description and drawings forming a part thereof, in which:—

Fig. 1 is a side elevation of my improved motor propelled cultivator.

Fig. 2 is a plan view of Fig. 1;

Fig. 3 is a view similar to Fig. 2 except that the motor and transmission has been removed, and the under-frame and cultivating instrumentalities are shown in dotted lines swung to one side;

Fig. 4 is a detail view showing in side elevation, the transmission mechanism between the motor and traction driving wheels;

Fig. 5 is a vertical transverse sectional view showing in detail the transmission, and Fig. 6 is a detail in section, showing the power connection between the motor and transmission.

Like characters of reference indicate corresponding parts throughout the figures.

*The frame.*—The main frame includes preferably the front cross-bar 1; the outside side-bars 2, 2; the rear curved bar 3 which describes an arc struck from the pivot point 4 intermediate the ends of the cross-bar 1; the centrally disposed longitudinal bar 5 connecting the front and rear bars 1 and 3; the bars 6, 6 on either side of the bar 3; the bars 6, 6 on either side of the bar 5 and connecting the bars 1 and 3, and the spaced parallel rods 7, 7 extending transversely of the main frame and secured in bearings 9, attached to the side-bars 2.

The under pivoted frame is slightly longer than the main frame but not quite so wide and includes the centrally disposed longitudinal bar 9 and the side bars $9^a$, $9^a$ which have the converging forward portions 10, and together with the bars $9^a$, $9^a$, have a pivotal connection at 4 with the bar 1 of the main frame; the transversely disposed bar 11 connecting the bars $9^a$, $9^a$, near their rear ends; the seat supporting bars 12, 12 connected to and extending rearwardly from the cross-bar 11 and having a seat 13 secured thereto; the short transverse bar 14 connecting the seat bars 12, 12, and the bars 15, 15 which are secured at their forward ends to the inside of the side bars $9^a$, $9^a$, and their rear ends secured to the cross-bar 14.

The main frame supports the motor and transmission, and the pivoted under-frame has connected therewith the cultivating instrumentalities and controlling means, as will be more fully explained.

*Transmission.*—The motor 16 is preferably a gasoline engine of any suitable type, supported upon frame parts 17, 17 and 18 mounted upon the main frame. The engine shaft 19 has a bearing in a standard 20 mounted upon the central longitudinal bar 5 and on the rear end of said engine shaft is secured a bevel pinion 21 meshing with and adapted to drive a bevel gear 22 on a driving shaft 23, the opposite ends of which are journaled in brackets 24, 24, mounted on the longitudinally disposed bars 6, 6, of the main frame. On this driving shaft, on either side of the standard 20 are secured a pair of forward driving pulleys 25, 25, and a pair of rearward driving pulleys 26, 26. Having a bearing in the upper ends of the brackets 24 is a cross shaft 27 on which is loosely carried a pair of idler pulley wheels 28, 28, one in line with each of the forward driving pulleys 25 on the shaft 23. 29, 29 designate axially aligned sections of a counter shaft, the outer ends of the said shaft sections having bearing in boxings 30 secured to the underside of the longitudinally disposed bars 2 and 6 of the main frame, and the ends of said shaft sections are journaled in a common boxing 31 secured to the underside of the central bar 5. On each counter shaft section 29 is secured a large driving pulley wheel 32, the face of which is equal to the combined faces of the pulley wheels 25 and 26. Connecting the forward driving pulley wheels 25 and the pulley wheels 32 are driving belts 33. These belts normally pass loosely over the idler pulley wheels 28, down and around the pulley wheels 32, up and over the pulley wheels 25 and down and around idler pulley wheels 34 journaled on brackets 35 adjustable on rods 36 carried in boxings secured to members of the main frame. Connecting the rear driving pulley wheels 26 and the pulley wheels 32 are driving belts 37. These belts normally pass loosely over the driving pulley wheels 26 and down and around the pulley wheels 32 and adapted to bear against one run of said belts, are idler pulley wheels 38 journaled on the said brackets 35. To each bracket 35 is connected a lever 38' and on each lever is a spring pressed detent 39 adapted to enter notches 40 in a segment 41. By moving the levers 38' downwardly the brackets 35 will move the idler pulley wheels 34 in a direction to tighten the forward driving belts 33, and also move the idler wheels 38 away from the belts 37, allowing said belts to run loose. By moving the levers 38' upwardly the brackets 35 will move the idler pulley wheels 38 in a direction to bear against and tighten the rear driving belts 37, and also move the idler wheels 34 to a position permitting the belts 33 to run loose.

On the outer end of each counter shaft section 29 is secured a spur gear pinion 42 meshing with a spur gear wheel 43 journaled on a short shaft 44 having a bearing in hangers 44 secured to and depending from the side bars 2 of the main frame. Secured to the outside face of each gear wheel 43 is a pin wheel 45 with which meshes the teeth of a spur gear wheel 46 secured to the inside faces of traction wheels 47, carried on axles 48 journaled in hangers 49 connected to and depending from the pair of parallel rods 7, 7.

The traction wheels 47, as will be observed, support the front end of the machine. The rear end of the machine is carried by a caster wheel 50 journaled on a shaft 51 having a bearing in the lower forked ends 52 of an upstanding shaft like member 53, journaled in an upstanding bearing member 54 connected with the rear end of the bar 9, and suitably braced from the cross-bar 11. Secured to and extending laterally from the forked ends 52 of the member 53, are foot rests 54' by means of which the operator may guide wheel 50 to the right or to the left and cause the oscillation of the under-frame to swing the cultivating instrumentalities to the right or to the left without disturbing the straight forward direction of the machine itself, as propelled by the traction wheels 47.

Connected with the bars 15 of the under-frame, are rollers 67 which roll on the under side of the rear curved bar 3 of the main frame, when said under-frame is swung to the right or to the left, and 68 denote stops secured to the curved rear bar 3, at suitable points, with which the rollers 67 will abut so that only a limited swinging movement of the under-frame may be had.

*Cultivating instrumentalities.*—These are preferably the ordinary cultivator shovels 55 connected in the usual manner with beams 56 which extend forwardly and upwardly and are connected with hangers 57 having a sleeve effect on a cross-rod 58 secured to the bars 9$^a$ of the under-frame. As shown, there are two sets of beams 56 on either side of the center of the machine, producing a two-row cultivator.

The beams 56 may be raised and lowered by the usual means, including levers 58 associated with a toothed segment 59 and having a crank arm 60 connected with the beams 56 by means of yieldingly connected rods 61. Connected with said levers 58 are other crank arms 62 and to these arms are connected other arms 63 to which are connected coil springs 64, the opposite ends of which are connected to the bars 9$^a$ of the under-frame. The cultivating instrumentalities described are not unlike those in common use and therefore have only been shown and described in a general way.

65 denotes short cross rods connected with the bars 9$^a$ and 15 of the under-frame, and secured to and depending from said rods are rods 66 which are adapted to bear against the cultivator beams as the under-frame is swung, to swing the beams in unison therewith.

*Operation.*—It is obvious that the traction wheels 47 may be driven in a forward direction through the pulley wheels 25 and 32, the belts 33 and gearing connecting the outer ends of the counter-shaft sections 29 with the wheels 47; also, that said traction wheels 47 may be driven in a reverse or backward direction through the pulley wheels 26 and 32, the belts 37 and gearing aforesaid, between the counter shaft sections 29 and said wheels 47.

To turn the machine, the operator may disconnect the power on one side of the machine by moving the pulley wheels 34 and 38 to a neutral position and drive only from the other side of the machine which will cause the machine to swing on the traction wheel 47 not in motion; or the operator may reverse the power on one side by driving through pulleys 26 and 32 and drive forward on the other side through pulleys 25 and 32. This will cause the machine to turn substantially in its own track.

When turning the machine through the driving means, the under frame will swing until the rollers 67 abut with the stops 68 when the entire frame will swing or turn in unison.

What I claim is:

1. In a machine of the character described, in combination, a main frame, a pair of forward traction driving wheels, a motor mounted on said main frame, mechanism for transmitting power from said motor to both of said wheels to drive the same in unison in a forward or reverse direction, or to drive either of said wheels independently of the other, an under-frame having a pivotal connection at its forward end with the forward end of the main frame, a caster wheel connected centrally with the rear end of said under-frame and means for turning said caster wheel whereby said under frame may be steered independently of said main frame.

2. In a machine of the character described, in combination, a main frame, a pair of forward traction driving wheels, a motor mounted on said frame, means for transmitting power from said motor to said wheels, an under-frame having a pivotal connection at its forward end with the forward end of the main frame, rollers on the under frame having a bearing with and adapted to roll on the main frame, stops for limiting the swinging movement between the main and under-frame, a caster wheel connected centrally with the rear end of said under-frame and having foot rests to adapt the same to be guided by an operator.

3. In a machine of the character described, in combination, a main frame, including a front cross-bar, and a rear curved bar, rods extending cross-wise of said frame, traction wheels, bearings for said wheels having connection with said rods, an under-frame including members meeting intermediate the ends of said front cross-bar and having a pivotal connection therewith and free to turn relative thereto, rollers journaled on said under-frame and engaging the underside of said curved rear bar, stops for limiting the swinging movement between the under and main frames, a single centrally disposed wheel supporting the rear portion of said under-frame and having a swiveled connection therewith.

4. A power propelled machine comprising a platform frame, a pair of hanger frames at each side of said platform frame, a supplemental frame pivoted to said platform frame, a caster wheel pivoted to said supplemental frame, traction wheels supported in said hanger frames, a pair of jack shafts supported on said platform frame and each extending to one side thereof over a hanger frame, gearing operatively connecting the end of each jack shaft over a hanger frame to the traction wheels, a source of power supported on said platform frame, a counter shaft driven by said source of power, and belt connections between said counter shaft and said jack shafts for independent forward, neutral or reverse drive.

5. In a power propelled machine, the combination with a traction element supporting a source of power, of a jack shaft, means operatively connecting said jack shaft to said traction element, means including toothed gears and pinions, a double face pulley fixed to said jack shaft, a counter shaft operatively connected to said source of power, a pair of pulleys fixed to said counter shaft, an idler pulley suitably supported in line with a pulley on said counter shaft, a pair of tightener pulleys suitably supported in line with said double face pulley, a belt passing around one of said counter shaft pulleys and said jack shaft pulley and against which one of said tightener pulleys may be moved and a belt passing around said double pulley, and the other of said tightener pulleys and over said idler and other counter shaft pulleys.

6. In a device of the class described, a main frame; tractor wheels located adjacent the front end of said main frame for propelling the same; steering mechanism carried by said main frame and cooperating with said wheels to steer the same; a supplemental frame pivoted to said main frame adjacent the front end of the latter, and adapted to swing relative thereto; and a castor wheel whereby the rear end of said supplemental frame is supported, and whereby said supplemental frame may be guided independently of said main frame.

7. In a tractor of the class described, a main frame; tractor wheels located adjacent the front end of said frame for supporting the same; means for driving said wheels independently of one another to thereby steer the tractor; a supplemental frame, the front end of which is pivoted to said main frame adjacent the front end of the latter; a seat carried by said supplemental frame; and a castor wheel located adjacent the rear end of said supplemental frame and operable from said seat, and whereby the rear end of said supplemental frame may be guided independently of said main frame.

8. In a tractor of the class described, a main frame; traction wheels whereby said main frame is supported; an engine; transmission mechanism through which said tractor wheels may be driven each independently of the other, to thereby steer said main frame; a supplemental frame pivotally connected adjacent its front end with said main frame; means for limiting the movement of said supplemental frame about the pivotal connection aforesaid relative to said main frame; a seat carried by said supplemental frame; and a castor wheel whereby the rear end of said supplemental frame is supported, said wheel being located adjacent said seat so that the same may be operated to swing the rear end of said supplemental frame from side to side from said seat.

9. In a tractor of the class described, a main frame; tractor wheels whereby said frame is supported; means for driving said tractor wheels; steering mechanism associated with said driving means for propelling the tractor; a supplemental frame, the front end of which is pivotally connected with said main frame; a castor wheel whereby the rear end of said supplemental frame is supported; a seat carried by said supplemental frame, and located adjacent said castor wheel, and whereby the latter may be operated to guide the rear end of said supplemental frame from said seat; and ground cultivating members carried by said supplemental frame.

In witness whereof, I have hereunto affixed my hand this 18 day of August, 1917.

WILLIAM N. SPRINGER.